(12) United States Patent
Ferrer Duran et al.

(10) Patent No.: US 12,401,290 B2
(45) Date of Patent: Aug. 26, 2025

(54) DC-TO-DC CONVERTER AND METHOD FOR CONTROLLING SAME

(71) Applicant: Lear Corporation, Southfield, MI (US)

(72) Inventors: Marc Ferrer Duran, Valls (ES); Cesar Ruano Alvarez, Valls (ES); Julia Gine Elies, Valls (ES); Youssef Ghabbour, Valls (ES); Ivan Casado Garcia, Valls (ES); Roser Rue Olive, Valls (ES); Luis Roda Cornejo, Valls (ES)

(73) Assignee: LEAR CORPORATION, Southfield, MI (US)

( * ) Notice: Subject to any disclaimer, the term of this patent is extended or adjusted under 35 U.S.C. 154(b) by 515 days.

(21) Appl. No.: 18/145,410

(22) Filed: Dec. 22, 2022

(65) Prior Publication Data

US 2024/0213882 A1  Jun. 27, 2024

(51) Int. Cl.
*H02M 3/335* (2006.01)
*B60L 53/22* (2019.01)
(Continued)

(52) U.S. Cl.
CPC ......... *H02M 3/33576* (2013.01); *B60L 53/22* (2019.02); *B60L 58/18* (2019.02);
(Continued)

(58) Field of Classification Search
CPC .......... B60L 53/00; B60L 53/20; B60L 53/22; B60L 58/10; B60L 58/18; B60L 2210/00; B60L 2210/10; H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS 7,965,529 B2    6/2011  Gibbs et al.
10,071,637 B2 *  9/2018  Kim ..................... B60L 53/00
(Continued)

*Primary Examiner* — Jeffrey A Gblende
(74) *Attorney, Agent, or Firm* — BROOKS KUSHMAN P.C.

(57) ABSTRACT

The present disclosure provides a converter including a primary stage having a plurality of primary stage switches, a secondary stage having a plurality of secondary stage switches and a capacitor, and a controller that isolates the secondary stage from a second battery, and that controls switching of the plurality of primary stage switches and the plurality of secondary stage switches to provide a plurality of bursts of energy from a first battery to the capacitor to pre-charge the capacitor to a threshold voltage, wherein after an initial burst of the plurality of bursts having an initial duration, a subsequent burst of the plurality of bursts provided has a duration equal to a duration of a preceding burst plus a time period based on a voltage of the first battery.

20 Claims, 3 Drawing Sheets

(51) Int. Cl.
   *B60L 58/18*         (2019.01)
   *H02M 1/00*         (2006.01)
(52) U.S. Cl.
   CPC ..... *H02M 1/0035* (2021.05); *H02M 3/33573*
      (2021.05); *B60L 2210/10* (2013.01)

(56) References Cited

U.S. PATENT DOCUMENTS

| | | |
|---|---|---|
| 10,759,294 B2 | 9/2020 | Nozawa |
| 11,031,634 B2* | 6/2021 | Winger .................. B60L 53/00 |
| 2006/0127704 A1* | 6/2006 | Raiser ..................... H02J 7/345 |
| | | 320/101 |
| 2020/0269718 A1 | 8/2020 | Isaksson |
| 2024/0001783 A1* | 1/2024 | Suzuki ..................... H02J 7/00 |

* cited by examiner

| HV RANGE [Vdc] | RATE t1 |
|---|---|
| 430 TO 470 | 50ns/ms |
| 290 TO 430 | 470ns/ms TO 50ns/ms |
| 250 TO 300 | 100ns/ms |

DC-TO-DC CONVERTER AND METHOD FOR CONTROLLING SAME

TECHNICAL FIELD

The present disclosure relates to a DC-to-DC converter and a method for controlling a DC-to-DC converter.

DETAILED DESCRIPTION

Figure 1:
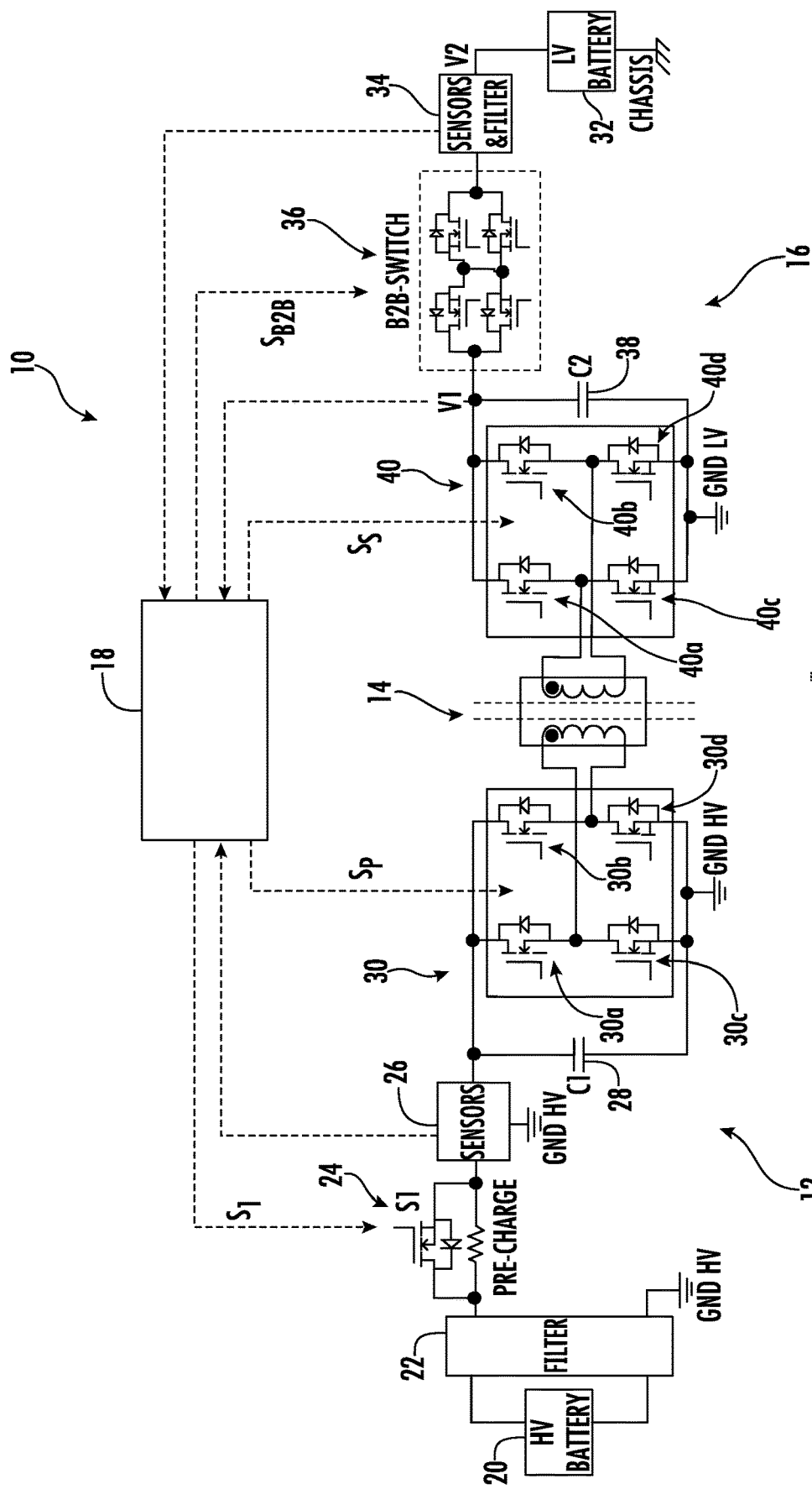
FIG. 1 is a simplified electrical schematic/block diagram of a non-limiting, exemplary embodiment of a DC-to-DC converter.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, features, and elements have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" and/or "at least one" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The present disclosure relates to pre-charging a low voltage stage in a direct-current-to-direct-current (DC-to-DC) voltage converter. In that regard, FIG. 1 is a simplified electrical schematic/block diagram of a non-limiting, exemplary embodiment of a DC-to-DC converter 10, which may be used in an electric vehicle (EV) or a hybrid electric vehicle (HEV).

In the embodiment shown, the converter 10 comprises a primary stage 12, a transformer 14, a secondary stage 16, and a controller 18. In that regard, it is noted that a DC-to-DC converter used in an EV or HEV may have two parallel DC-to-DC converter rails connected at an output. Only one such rail is shown in FIG. 1 for simplicity.

A high-voltage battery 20, a filter 22 (to prevent noise trespassing), a pre-charge switch 24 (shown in FIG. 1 as a metal-oxide-semiconductor field-effect transistor (MOSFET)), sensors 26, and a capacitor 28 are connected to the primary stage 12 of the DC-to-DC converter 10. The primary stage 12 comprises an H-Bridge configuration 30 of a plurality of MOSFETs 30a, 30b, 30c, 30d. The primary stage 12 may alternatively be referred to as a first or high-voltage stage or side.

A low-voltage (LV) battery 32, which may be part of a vehicle low-voltage network, sensors/filters 34, a back-to-back (B2B) switch 36 (shown in FIG. 1 as two pairs of MOSFETs provided in a back-to-back configuration), and a capacitor 38 are connected to the secondary stage of the DC-to-DC converter 10. The secondary stage 16 comprises an H-Bridge configuration 40 of a plurality of MOSFETs 40a, 40b, 40c, 40d. It is noted that the capacitor 38 may be provided for filtering of the output of the H-Bridge 40. The secondary stage 16 may alternatively be referred to as a second or low-voltage stage or side.

As is well known to those of ordinary skill, the controller 18 is configured to control and controls the ON/OFF switching operations, including duty cycle, of the transistors of the H-Bridge 30 and the H-Bridge 40 (as well as the ON/OFF operation of pre-charge switch 24 and the B2B switch 36) via switching control signals ($s_p$) generated by and transmitted from the controller 18 to the MOSFETs 30a, 30b, 30c, 30d of the primary stage 12 and switching control signals ($s_s$) generated by and transmitted from the controller 18 to the MOSFETs 40a, 40b, 40c, 40d of the secondary stage 16 according to a desired switching frequency. In such a fashion, the controller 18 operates the DC-to-DC converter 10 in a mode in order to convert the high-voltage supplied by the HV battery 20 to a low-voltage and thereby charge the LV battery 32 and/or power the vehicle low-voltage network. In that regard, it is also noted that the DC-to-DC converter 10 may be bi-directional, also passing energy from LV to HV. As used herein, high-voltage may refer to a voltage greater than or equal 48 volts, while low-voltage may refer to a voltage less than or equal to 24 volts. Such a DC-to-DC converter is shown and described in detail in U.S. Pat. No. 11,502,613 B2, which is hereby incorporated herein by reference in its entirety.

Still referring to FIG. 1, at a start of the DC-to-DC converter 10, the controller 18 closes the B2B switch 36 (via a switch control signal $s_{B2B}$) to enable energy flow to the low-voltage network and the LV battery 32. However, as the capacitor 38 may be discharged at such a start of the DC-to-DC converter 10 and as the voltage at V1 may be nearly zero (0) volts at such a start, connecting V1 to V2 by closing the B2B switch 36 may lead the capacitor 38 to generate a peak current. That is, in such circumstances, a peak current may flow from the LV battery 32 to the capacitor 38. As a result, output sensors 34 detecting such a peak current may result in the controller 18 raising, generating, or determining a system overcurrent alarm and, in response, opening the B2B switch 36 (via a switch control signal $s_{B2B}$). Such peak current may also stress components at the secondary (i.e., low-voltage) stage 16 of the DC-to-DC converter 10.

The present disclosure addresses such problems associated with the operation of the DC-to-DC converter 10. In that regard, according to the present disclosure, the capacitor 38 in the secondary stage 16 is pre-charged with conversion bursts from the DC-to-DC converter 10 operated by the controller 18 in an open-loop mode to avoid undesired inrush current from the LV battery 32 at closure of the B2B switch 36 that would trigger the system over-current alarm. More specifically, before connecting the DC-to-DC converter 10 to the low-voltage network by closing the B2B-Switch 36, the controller controls the DC-to-DC converter 10 to pre-charge the capacitor 38 connected in parallel to the H-Bridge configured transistors 40a, 40b, 40c, 40d of the secondary stage 16. In that regard, the DC-to-DC converter 10 is activated and operated by the controller 18 in an open-loop mode, providing consecutive short pulses of energy to capacitor 38 during a selected period of time (e.g., 10 millisecond (ms)). If the voltage of the capacitor 38 fails to reach an expected level after that time period, then an anomaly at the MOSFETS 30a, 30b, 30c, 30d, 40a, 40b, 40c, and/or 40d in the H-Bridges is identified.

Figure 2:
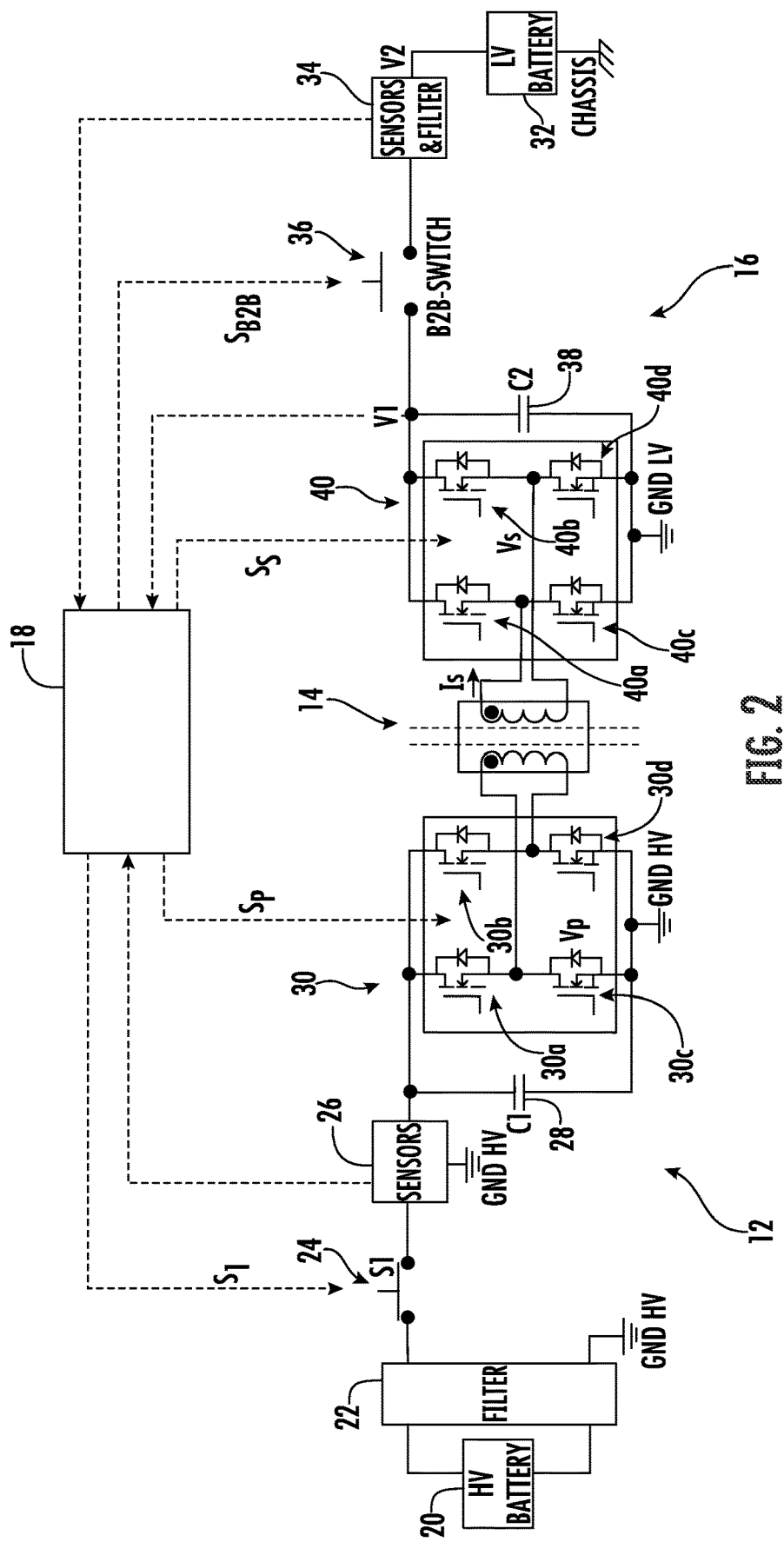
FIG. 2 is a simplified electrical schematic/block diagram of a non-limiting, exemplary embodiment of a DC-to-DC converter.
Figures 3, 4:
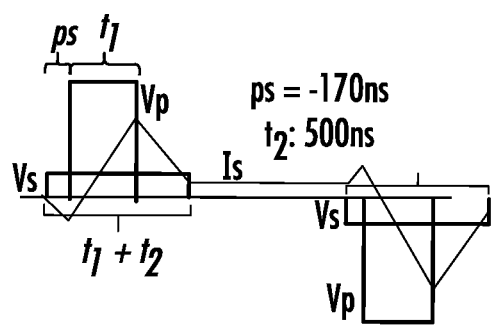
FIG. 3 is a table of selected time periods corresponding to battery voltage ranges in a non-limiting, exemplary embodiment according to the present application.
FIG. 4 is a simplified timing and signal diagram illustrating exemplary charging pulses in a non-limiting, exemplary embodiment according to the present disclosure.

In that regard, FIG. 2 is a simplified electrical schematic/block diagram of a non-limiting, exemplary embodiment of a DC-to-DC converter 10, similar to that of FIG. 1. FIG. 3 is a table of selected time periods corresponding to battery voltage ranges in a non-limiting, exemplary embodiment according to the present application. FIG. 4 is a simplified timing and signal diagram illustrating exemplary charging pulses in a non-limiting, exemplary embodiment according to the present disclosure.

With reference to FIGS. 2-4, at a start of the DC-to-DC converter 10, the controller 18 closes the pre-charge switch 24 (via a switch control signal $s_1$) and keeps open the B2B switch 36 (via a switch control signal $s_{B2B}$) to isolate the low-voltage network and LV battery 32 from the capacitor 38. In that regard, it is noted that the B2B switch 36 is open when the DC-to-DC converter 10 stops operation, and stays open until it is closed afterwards. The controller 18 also sets the DC-to-DC converter 10 in an open-loop mode and pre-charges the capacitor 38 to a selected, threshold, or target voltage by operating the MOSFETs 30a, 30b, 30c, 30d, of the primary stage 12 and the MOSFETS 40a, 40b, 40c, 40d of the secondary stage 16. More specifically, the controller operates the DC-to-DC controller 10 in an open-loop mode by switching control signals ($s_p$) generated by and transmitted from the controller 18 to the MOSFETs 30a, 30b, 30c, 30d of the primary stage 12 and switching control signals ($s_s$) generated by and transmitted from the controller 18 to the MOSFETs 40a, 40b, 40c, 40d of the secondary stage 16 according to a desired switching frequency (e.g., 100 kHz). In that regard, it is noted that the particular target voltage utilized, designated, or selected depends on the system involved. For example, in a system having an overvoltage alarm at 17.5 volts, the capacitor 38 may be pre-charged to a selected, threshold, or target voltage of 15.5 volts in order to avoid triggering such an overvoltage alarm.

In one embodiment of the present disclosure, such pre-charging of the capacitor 38 is controlled by the controller 18 operating the DC-to-DC converter 10 for a selected period of time, such as 10 ms, to provide controller bursts of energy of selected durations ($t_1+t_2$) as seen in FIG. 4. In such an embodiment, $t_1$ is initially set to 500 nanoseconds (ns) and $t_2$ is set to a constant 500 ns. At a selected time such as every 1 ms, the controller 18 increases $t_1$ in value from an initial duration of 500 ns to a maximum duration of 4 microseconds (µs), while V1 (i.e., the continuous DC voltage level or charge of the capacitor 38) increases up to the selected, threshold, or target voltage. In that regard, it is noted that alternative times $t_1$ and $t_2$ may be utilized, designated, or selected depending on the system involved.

In that regard, the rate of such an increase depends on the voltage of the HV battery 20. As seen in FIG. 3, according to one embodiment of the present disclosure, for an HV battery 20 having a voltage in the range of 430 to 470 volts DC, the rate of increase of $t_1$ by the controller 18 is 50 ns/ms. For an HV battery 20 having a voltage in the range of 290 to 430 volts DC, the rate of increase of $t_1$ by the controller 18 is 470 ns/ms to 50 ns/ms. For an HV battery 20 having a voltage in the range of 250 to 300 volts DC, the rate of increase of $t_1$ by the controller 18 is 100 ns/ms. Thus, over a 10 ms time frame, the duration $t_1$ of an initial energy burst produced by the controller 18 controlling the DC-to-DC converter 10 starts at 500 ns, and then every 1 ms the duration $t_1$ of a subsequent energy burst increases in value up to a maximum of 4 us at a rate shown in FIG. 3 depending on the voltage of the HV battery 20. Once again, it is noted that alternative voltages, voltage ranges, times and/or rates may be utilized, designated, or selected depending on the system involved.

If the voltage at V1 (i.e., the continuous DC voltage level or charge of the capacitor 38) has not reached the selected, threshold, or target voltage after 10 ms, then the controller 18 determines that one or more of the MOSFETs 40a, 40b, 40c, 40d of the secondary stage 16 have been damaged. In such a fashion, the present disclosure provides a MOSFET health monitoring mechanism for the DC-to-DC converter 10. Alternatively, when the voltage at V1 (i.e., the continuous DC voltage level or charge of the capacitor 38) reaches the selected, threshold, or target voltage, then the controller 18 closes the B2B switch 36 (via a switch control signal $s_{B2B}$) to connect the capacitor 38 to the low-voltage network and the LV battery 32. In such a fashion, the controller 18 thereby ends the pre-charge operation and begins normal mode operation of the DC-to-DC converter 10.

Exemplary timing for switch operation and the production of primary and secondary voltages in a DC-to-DC converter is described in detail in U.S. Patent Application Publication No. 2022/077789 A1, which is hereby incorporated herein by reference in its entirety. An example of the relationship between the switched voltage $V_p$ of the primary stage 12, the switched voltage Vs of the secondary stage 16, and the current $I_s$ of the secondary stage 16, as controlled by the controller 18 according to the present disclosure, is shown in the timing and signal diagram of FIG. 4.

As seen therein, according to one embodiment of the present disclosure, the controller 18 operates the MOSFETS 30a, 30b, 30c, 30d of the primary stage 12 and the MOSFETS 40a, 40b, 40c, 40d of the secondary stage 16 to produce bursts of energy, in particular a primary switched voltage $V_p$ for a duration or time $t_1$ as previously described and a secondary switched voltage Vs for a duration or time $(t_1+t_2)$ as also previously described. The time between switching on the voltage at the primary stage 12 and then switching on the secondary stage 16 by the controller 18 is shown therein as phase-shift time, ps. In one embodiment according to the present disclosure, the phases-shift time is −170 ns. Once again, however, it is noted that an alternative phase-shift time may be utilized, designated, or selected depending on the system involved.

As seen in FIG. 4, according to the present disclosure, the controller 18 controls the MOSFETS 30a, 30b, 30c, 30d of the primary stage 12 and the MOSFETS 40a, 40b, 40c, 40d of the secondary stage 16 to add a gap or dead time between switched energy pulses or bursts, in contrast to switching during normal mode operation where no dead time occurs between switched energy pulses or bursts. In that regard, the period of the energy pulses or bursts (i.e., the time from the start of one pulse to the start of the next pulse) is fixed based on the switching frequency (e.g., 100 kHz) employed by the controller 18 for operation of the MOSFETS 30a, 30b, 30c, 30d of the primary stage 12 and the MOSFETS 40a, 40b, 40c, 40d of the secondary stage 16. The dead time between energy pulses or bursts thus decreases as the duty cycle of $(t_1+t_2)$ increases according to the present disclosure as described herein.

As those skilled in the art will understand, the controller 18, as well as any other component, system, subsystem, unit, module, circuit, stage, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof, any component, system, subsystem, unit, module, circuit, stage, interface, sensor, device, or the like described herein, and/or for performing the particular algorithm or algorithms represented by the various methods, functions and/or operations described herein, including interaction between and/or cooperation with each other.

Item 1: According to an embodiment, the present disclosure provides a converter comprising a primary stage comprising a plurality of primary stage switches, a secondary stage comprising a plurality of secondary stage switches and a capacitor, and a controller that isolates the secondary stage from a second battery, and that controls switching of the plurality of primary stage switches and the plurality of secondary stage switches to provide a plurality of bursts of energy from a first battery to the capacitor to pre-charge the capacitor to a target voltage, wherein after an initial burst of the plurality of bursts having an initial duration, a subsequent burst of the plurality of bursts provided has a duration equal to a duration of a preceding burst plus a time period based on a voltage of the first battery.

Item 2: In another embodiment, the present disclosure provides the converter according to Item 1 wherein the controller controls the plurality of primary stage switches and the plurality of secondary stage switches to pre-charge the capacitor for a selected period of time.

Item 3: In another embodiment, the present disclosure provides the converter according to Item 1 or Item 2 wherein the controller controls the plurality of primary stage switches and plurality of secondary stage switches to provide the plurality of bursts of energy until the capacitor reaches a charge equal to the target voltage.

Item 4: In another embodiment, the present disclosure provides the converter according to any of Items 1-3 wherein the controller controls the plurality of primary stage switches and the plurality of secondary stage switches to produce the subsequent burst of the plurality of bursts at a selected time after the initial burst of the plurality of bursts.

Item 5: In another embodiment, the present disclosure provides the converter according to any of Items 1-4 wherein the controller controls the plurality of primary stage switches and the plurality of secondary stage switches to produce another subsequent burst of the plurality of bursts at the selected time after the subsequent burst of the plurality of bursts.

Item 6: In another embodiment, the present disclosure provides the converter according to any of Items 1-5 wherein a duration of another subsequent burst is limited to a maximum duration when a sum of the time period dependent upon the voltage of the first battery and a duration of a burst immediately preceding the another subsequent burst exceeds the maximum duration.

Item 7: In another embodiment, the present disclosure provides the converter according to any of Items 1-6 wherein the time period based on the voltage of the first battery has a first value when the voltage of the first battery falls within a first voltage range, and wherein the time period based on the voltage of the first battery has a second value when the voltage of the first battery falls within a second voltage range different than the first voltage range.

Item 8: In another embodiment, the present disclosure provides the converter according to any of Items 1-7 wherein the controller connects the secondary stage to the second battery in response to a charge of the capacitor reaching the target voltage.

Item 9: In another embodiment, the present disclosure provides the converter according to any of Items 1-8 wherein a failure of the capacitor to reach a charge equal to the target voltage within a threshold period of time indicates damage to at least one of the plurality of secondary stage switches.

Item 10: In another embodiment, the present disclosure provides the converter according to any of Items 1-9 wherein the first battery has a voltage of greater than or equal to 48 volts and the second battery has a voltage of less than or equal to 24 volts.

Item 11: According to an embodiment, the present disclosure provides a non-transitory computer readable medium having stored computer executable instructions for controlling a converter comprising (i) a primary stage comprising a plurality of primary stage switches, (ii) a secondary stage comprising a plurality of secondary stage switches and a capacitor, and (iii) a controller, wherein execution of the instructions causes the controller to isolate the secondary stage from a second battery, and control switching of the plurality of primary stage switches and the plurality of secondary stage switches to provide a plurality of bursts of energy from a first battery to the capacitor to pre-charge the capacitor to a target voltage, wherein after an initial burst of the plurality of bursts having an initial duration, a subsequent burst of the plurality of bursts provided has a duration equal to a duration of a preceding burst plus a time period based on a voltage of first battery.

Item 12: In another embodiment, the present disclosure provides the non-transitory computer readable medium according to Item 11 wherein execution of the instructions further causes the controller to control the plurality of primary stage switches and the plurality of secondary stage switches to pre-charge the capacitor for a selected period of time.

Item 13: In another embodiment, the present disclosure provides the non-transitory computer readable medium according to Item 11 or Item 12 wherein execution of the instructions further causes the controller to control the plurality of primary stage switches and plurality of secondary stage switches to provide the plurality of bursts of energy until the capacitor reaches a charge equal to the target voltage.

Item 14: In another embodiment, the present disclosure provides the non-transitory computer readable medium according to any of Items 11-13 wherein execution of the instructions further causes the controller to control the plurality of primary stage switches and the plurality of secondary stage switches to produce the subsequent burst of the plurality of bursts at a selected time after the initial burst of the plurality of bursts.

Item 15: In another embodiment, the present disclosure provides the non-transitory computer readable medium according to any of Items 11-14 wherein execution of the instructions further causes the controller to control the plurality of primary stage switches and the plurality of secondary stage switches to produce another subsequent burst of the plurality of bursts at the selected time after the subsequent burst of the plurality of bursts.

Item 16: In another embodiment, the present disclosure provides the non-transitory computer readable medium according to any of Items 11-15 wherein a duration of another subsequent burst is limited to a maximum duration when a sum of the time period dependent upon the voltage of the first battery and a duration of a burst immediately preceding the another subsequent burst exceeds the maximum duration.

Item 17: In another embodiment, the present disclosure provides the non-transitory computer readable medium according to any of Items 11-16 wherein the time period based on the voltage of the first battery has a first value when the voltage of the first battery falls within a first voltage range, and wherein the time period based on the voltage of the first battery has a second value when the voltage of the first battery falls within a second voltage range different than the first voltage range.

Item 18: In another embodiment, the present disclosure provides the non-transitory computer readable medium according to any of Items 11-17 wherein execution of the instructions further causes the controller to connect the secondary stage to the second battery in response to a charge of the capacitor reaching the target voltage.

Item 19: In another embodiment, the present disclosure provides the non-transitory computer readable medium according to any of Items 11-18 wherein a failure of the capacitor to reach a charge equal to the target voltage within a threshold period of time indicates damage to at least one of the plurality of secondary stage switches.

Item 20: In another embodiment, the present disclosure provides the non-transitory computer readable medium according to any of Items 11-19 wherein the first battery has a voltage of greater than or equal to 48 volts and the second battery has a voltage of less than or equal to 24 volts.

The present disclosure thus provides for a DC-to-DC converter wherein a low-voltage output overcurrent alarm may be provided without undesired triggering. The present disclosure also provides a DC-to-DC converter wherein component stress is reduced, thereby increasing component and converter lifespans. The present disclosure further provides a DC-to-DC converter wherein MOSFET malfunction is monitored before full power transfer is initiated. Still further, the present disclosure may be implemented without hardware additions to a DC-to-DC converter, utilizing a software concept for control of a DC-to-DC converter by a programmed controller.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, unless the context clearly indicates otherwise, the various features, elements, components, methods, procedures, steps, and/or functions of various implementing embodiments may be combined or utilized in any combination or combinations and/or may be performed in any order other than those specifically described herein to form further embodiments according to the present disclosure.

What is claimed is:

1. A converter comprising:
a primary stage comprising a plurality of primary stage switches;
a secondary stage comprising a plurality of secondary stage switches and a capacitor; and
a controller that isolates the secondary stage from a second battery, and that controls switching of the plurality of primary stage switches and the plurality of secondary stage switches to provide a plurality of bursts of energy from a first battery to the capacitor to pre-charge the capacitor to a target voltage;
wherein after an initial burst of the plurality of bursts having an initial duration, a subsequent burst of the plurality of bursts provided has a duration equal to a duration of a preceding burst plus a time period based on a voltage of the first battery.

2. The converter according to claim 1 wherein the controller controls the plurality of primary stage switches and the plurality of secondary stage switches to pre-charge the capacitor for a selected period of time.

3. The converter according to claim 1 wherein the controller controls the plurality of primary stage switches and plurality of secondary stage switches to provide the plurality of bursts of energy until the capacitor reaches a charge equal to the target voltage.

4. The converter according to claim 1 wherein the controller controls the plurality of primary stage switches and the plurality of secondary stage switches to produce the subsequent burst of the plurality of bursts at a selected time after the initial burst of the plurality of bursts.

5. The converter according to claim 4 wherein the controller controls the plurality of primary stage switches and the plurality of secondary stage switches to produce another subsequent burst of the plurality of bursts at the selected time after the subsequent burst of the plurality of bursts.

6. The converter according to claim 1 wherein a duration of another subsequent burst is limited to a maximum duration when a sum of the time period dependent upon the voltage of the first battery and a duration of a burst immediately preceding the another subsequent burst exceeds the maximum duration.

7. The converter according to claim 1 wherein the time period based on the voltage of the first battery has a first value when the voltage of the first battery falls within a first voltage range, and wherein the time period based on the voltage of the first battery has a second value when the voltage of the first battery falls within a second voltage range different than the first voltage range.

8. The converter according to claim 1 wherein the controller connects the secondary stage to the second battery in response to a charge of the capacitor reaching the target voltage.

9. The converter according to claim 1 wherein a failure of the capacitor to reach a charge equal to the target voltage within a threshold period of time indicates damage to at least one of the plurality of secondary stage switches.

10. The converter according to claim 1 wherein the first battery has a voltage of greater than or equal to 48 volts and the second battery has a voltage of less than or equal to 24 volts.

11. A non-transitory computer readable medium having stored computer executable instructions for controlling a converter comprising (i) a primary stage comprising a plurality of primary stage switches, (ii) a secondary stage comprising a plurality of secondary stage switches and a capacitor, and (iii) a controller, wherein execution of the instructions causes the controller to:
    isolate the secondary stage from a second battery; and
    control switching of the plurality of primary stage switches and the plurality of secondary stage switches to provide a plurality of bursts of energy from a first battery to the capacitor to pre-charge the capacitor to a target voltage;
    wherein after an initial burst of the plurality of bursts having an initial duration, a subsequent burst of the plurality of bursts provided has a duration equal to a duration of a preceding burst plus a time period based on a voltage of first battery.

12. The non-transitory computer readable medium according to claim 11 wherein execution of the instructions further causes the controller to control the plurality of primary stage switches and the plurality of secondary stage switches to pre-charge the capacitor for a selected period of time.

13. The non-transitory computer readable medium according to claim 11 wherein execution of the instructions further causes the controller to control the plurality of primary stage switches and plurality of secondary stage switches to provide the plurality of bursts of energy until the capacitor reaches a charge equal to the target voltage.

14. The non-transitory computer readable medium according to claim 11 wherein execution of the instructions further causes the controller to control the plurality of primary stage switches and the plurality of secondary stage switches to produce the subsequent burst of the plurality of bursts at a selected time after the initial burst of the plurality of bursts.

15. The non-transitory computer readable medium according to claim 14 wherein execution of the instructions further causes the controller to control the plurality of primary stage switches and the plurality of secondary stage switches to produce another subsequent burst of the plurality of bursts at the selected time after the subsequent burst of the plurality of bursts.

16. The non-transitory computer readable medium according to claim 11 wherein a duration of another subsequent burst is limited to a maximum duration when a sum of the time period dependent upon the voltage of the first battery and a duration of a burst immediately preceding the another subsequent burst exceeds the maximum duration.

17. The non-transitory computer readable medium according to claim 11 wherein the time period based on the voltage of the first battery has a first value when the voltage of the first battery falls within a first voltage range, and wherein the time period based on the voltage of the first battery has a second value when the voltage of the first battery falls within a second voltage range different than the first voltage range.

18. The non-transitory computer readable medium according to claim 11 wherein execution of the instructions further causes the controller to connect the secondary stage to the second battery in response to a charge of the capacitor reaching the target voltage.

19. The non-transitory computer readable medium according to claim 11 wherein a failure of the capacitor to reach a charge equal to the target voltage within a threshold period of time indicates damage to at least one of the plurality of secondary stage switches.

20. The non-transitory computer readable medium according to claim 11 wherein the first battery has a voltage of greater than or equal to 48 volts and the second battery has a voltage of less than or equal to 24 volts.

* * * * *